United States Patent [19]
Fujimoto et al.

[11] Patent Number: 5,599,142
[45] Date of Patent: Feb. 4, 1997

[54] DRILLING CONTROL APPARATUS

[75] Inventors: Akihiko Fujimoto; Takashi Nagatomi; Naoki Sato, all of Minamitsuru-gun, Japan

[73] Assignee: Fanuc Ltd., Yamanashi, Japan

[21] Appl. No.: 374,798

[22] PCT Filed: Jun. 16, 1994

[86] PCT No.: PCT/JP94/00981

§ 371 Date: Feb. 15, 1995

§ 102(e) Date: Feb. 15, 1995

[87] PCT Pub. No.: WO95/02485

PCT Pub. Date: Jan. 26, 1995

[30] Foreign Application Priority Data

Jul. 13, 1993 [JP] Japan .................................. 5-172810
Aug. 6, 1993 [JP] Japan .................................. 5-196353

[51] Int. Cl.⁶ .............................. B23B 39/08; B23B 49/00
[52] U.S. Cl. ................. 408/10; 364/474.02; 364/474.17; 408/3; 408/6
[58] Field of Search ................................ 408/3, 5, 6, 8–11; 364/474.02, 474.15–474.17, 474.22

[56] References Cited

U.S. PATENT DOCUMENTS

| | | | |
|---|---|---|---|
| 4,451,187 | 5/1984 | Ishikawa et al. | 409/187 |
| 5,116,168 | 5/1992 | Aihara | 408/9 |

FOREIGN PATENT DOCUMENTS

| | | |
|---|---|---|
| 0339659 | 11/1989 | European Pat. Off. . |
| 56-62748 | 5/1956 | Japan . |
| 54-55879 | 4/1979 | Japan . |
| 54-102681 | 8/1979 | Japan . |
| 57-138559 | 8/1982 | Japan . |
| 58-177255 | 11/1983 | Japan . |
| 61-4615 | 2/1986 | Japan . |
| 62-35752 | 3/1987 | Japan . |
| 2-198745 | 8/1990 | Japan . |

*Primary Examiner*—Steven C. Bishop
*Attorney, Agent, or Firm*—Staas & Halsey

[57] ABSTRACT

In a drilling control apparatus for properly controlling a load sitting on a drill, a cutting reaction force estimate unit (1) estimates a disturbance load torque Yz acting on a servomotor (feed axis) (63) based on a speed signal X1z to the servomotor (63) and a torque value U1z commanded to the servomotor (63). In drilling operations, the cutting reaction force Yz is equivalent to a cutting reaction force generated between a drill (75) and a workpiece (91). Note, rotation of the drill (75) is controlled by a spindle motor (73) and a position in a Z-axis direction of the drill (75) and a feed speed of the drill (75) are controlled by the servomotor (63) through a spindle head (74). A cutting reaction force monitor unit (2) monitors whether a cutting reaction force estimated by the cutting reaction force estimate unit (1) follows a predetermined pattern, and if not, then a feed axis torque control unit (3) controls a torque of the servomotor (63) to cause the cutting reaction force to follow the predetermined pattern. The cutting reaction force generated between the drill (75) and the workpiece (91) is changed according to the predetermined pattern by a torque control of the feed axis.

7 Claims, 9 Drawing Sheets

DRILLING CONTROL APPARATUS

TECHNICAL FIELD

The present invention relates to a drilling control apparatus for drilling holes using a numerically controlled machine tool.

BACKGROUND ART

A numerically controlled machine tool drills holes by controlling RPMs of a spindle and a feed axis so that the RPM of the spindle and an amount of feed commanded on a machining program as cutting conditions coincide with an actual RPM of the spindle and an actual amount of feed.

Incidentally, a tip configuration of a drill is gradually changed while drilling operation is repeated. Although proper cutting conditions are also sequentially changed accordingly, unless the conditions are positively changed on the machining program, drilling is carried out with a given amount of feed. Consequently, a load on the drill is gradually changed and holes may be defectively drilled or sometimes the drill may be broken.

Further, even if a load on a drill is very small, since an amount of feed is given, sometimes a drilling efficiency may be deteriorated.

To cope with this problem, there have been conventionally proposed adaptive control methods of preventing an unnecessary load from being applied on a drill.

For example, the applicant proposed in Japanese Patent Application Laid-Open No. 4-240011 an arrangement that a load sensor is disposed in an arbor mounted on a spindle to sense a load torque of a drill and when a detecting signal of the sensor is greater than a set load level, the drill is retracted once and drilling operation is continued again after changing an amount of feed.

In the conventional method, however, since an object to be controlled is a cutting feed speed (F) commanded by a program and the load torque of the drill is indirectly controlled by controlling the cutting feed speed F, it cannot be always said that a load on the drill is properly controlled.

Further, a load torque imposed on a drill is greatly varied by factors such as a depth of a drilled hole, and an amount of chips produced between a drill groove and the inner wall of the drilled hole. In the above conventional method, since an upper limit is set to the load torque and the cutting feed speed F affecting the load torque is positively changed, sometimes the load torque is too abruptly varied and the drill may be broken before the abnormal torque is sensed and the drill is retracted.

On the contrary, when a load is set to a sufficiently low level, the cutting feed speed F must be made small accordingly. As a result, a longer time is needed to drill holes and a drilling efficiency is deteriorated.

Further, since a command of the cutting feed speed F is automatically changed, it is difficult for the operator to get a correct value of the cutting feed speed F at any given time.

DISCLOSURE OF THE INVENTION

Taking the above into consideration, an object of the present invention is to provide a drilling control apparatus capable of properly controlling a load on a drill.

To solve the above problem, in accordance with the present invention, there is provided a drilling control apparatus for drilling holes using a numerically controlled machine tool, which comprises cutting reaction force estimate unit for estimating a cutting reaction force in an axis direction generated between a drill and a workpiece, cutting reaction force monitor unit means for monitoring whether or not a cutting reaction force estimated by the cutting reaction force estimate unit follows a predetermined command pattern, and feed axis torque control unit for controlling a torque of a feed axis of the drill to cause the estimated cutting reaction force to follow the command pattern when the estimated cutting reaction force does not follow the command pattern.

The cutting reaction force estimate unit estimates a cutting reaction force in the axis direction generated between the drill and the workpiece. The cutting reaction force monitor unit monitors whether the cutting reaction force estimated by the cutting reaction force estimate unit follows a predetermined command pattern. When the estimated cutting reaction force does not follow the command pattern, the feed axis torque control unit controls a torque of the feed axis of the drill to cause the estimated cutting reaction force to follow the command pattern. The reaction force generated between the drill and the workpiece is changed according to the command pattern by the torque control of the feed axis.

DISCLOSURE OF THE INVENTION

An embodiment of the present invention will be described below with reference to the drawings.

Figure 2:
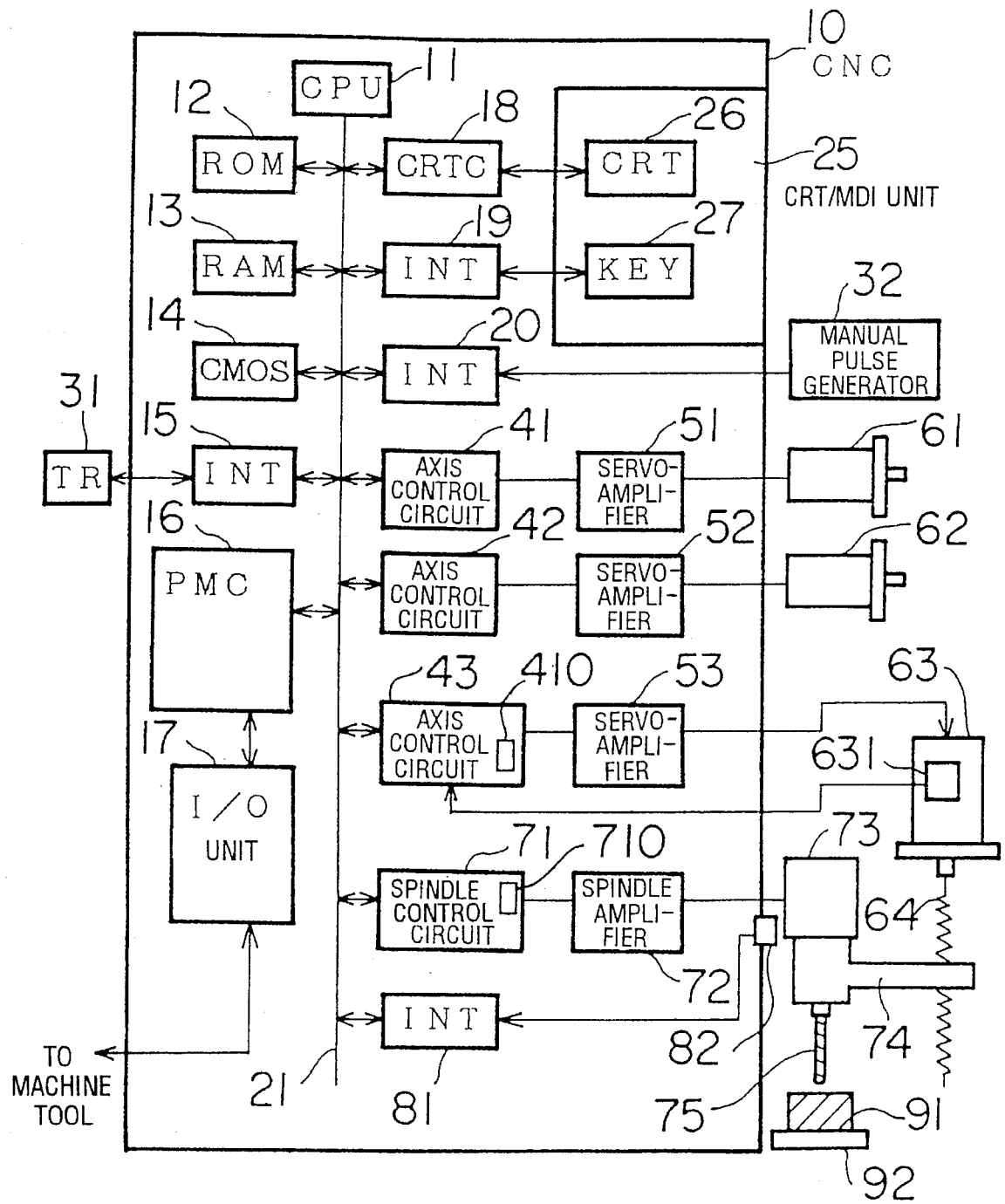
FIG. 2 is a block diagram of a hardware arrangement of a numerically controlled machine tool (CNC) embodying a drilling control apparatus of the present invention.

FIG. 2 is a block diagram of a hardware arrangement of a numerically controlled machine tool (CNC) embodying a drilling control apparatus of the present invention. In FIG. 2, numeral 10 denotes a numerical control apparatus (CNC). A processor 11, which controls the numerical control apparatus (CNC) 10 as a whole, reads out a system program stored in a ROM 12 through a bus 21 and controls the numerical control apparatus (CNC) 10 according to the system program. A RAM 13, which is composed of a DRAM, stores temporary calculation data, display data and the like. A CMOS 14 stores machining programs, various parameters and the like. Since the CMOS 14 is composed of a nonvolatile memory and backed up by a battery, not shown, it retains the above data as they are even after a power supply to the numerical control apparatus (CNC) 10 is turned off.

An interface 15 for external units is connected to an external unit 31 such as a paper tape reader, paper tape puncher, paper tape reader/puncher and the like. A machining program can be read from the paper tape reader and a machining program edited in the numerical control apparatus (CNC) 10 can be output to the paper tape puncher.

A PMC (programmable machine controller) 16 is contained in the CNC 10 and controls a machine tool by a sequence program created in a ladder fashion. More specifically, an M function, S function and T function commanded by a machining program are converted through a sequence program into signals needed by the machine tool and output to the machine tool from an I/O unit 17. The magnets and the like of the machine tool are driven in response to the output signal to thereby operate hydraulic valves, pneumatic valves, electric actuators and the like. Further, the PMC 16 receives signals from the limit switches of the machine tool and the switches of a machine operation panel, and the like, subjects the signals to necessary processing and delivers the same to the processor 11.

A graphic control circuit 18 converts digital data such as present positions of respective axes, alarm, parameters, image data, and the like into image signals and outputs them. The image signals are sent to the display unit 26 of a CRT/MDI unit 25 and displayed thereon. An interface 19 receives data from the keyboard 27 of the CRT/MDI unit 25 and delivers the same to the processor 11.

An interface 20 is connected to a manual pulse generator 32 and receives pulses therefrom. The manual pulse generator 32 is mounted on the machine control panel which is not shown here and used to precisely position the moving portions of the machine tool by hand.

Axis control circuits 41–43 receive movement commands for respective axes from the processor 11 and output the commands to servoamplifiers 51–53. On receiving the movement commands, the servoamplifiers 51–53 drive the servomotors 61–63 of the respective axes. The servomotor 63 for controlling the feed of a Z-axis rotates a ball screw 64 to control a position and a feed speed of a spindle head 74 connected to a spindle motor 73 in a Z-axis direction. Further, the servomotor 63 contains a position sensing pulse coder 631 from which a position signal is fed back to the axis control circuit 43 as a pulse train. Although it is not shown here, each of the servomotor 61 for controlling a feed of the X-axis and the servomotor 62 for controlling a feed of the Y-axis also contains a position sensing pulse coder similar to that of the servomotor 63, and a position signal from the pulse coder is also fed back as a pulse train. Sometimes, a linear scale is used as the position sensor. Further, a speed signal X1z can be created by subjecting the pulse train to an F/V (frequency/velocity) conversion.

The axis control circuit 43 processes software by a processor (not shown) provided therewith and includes an observer 410 as a part of the function. The observer 410 estimates a disturbance load torque Ys acting on the servomotor 63 by receiving the speed signal X1z and the like. The estimated disturbance load torque Yz (hereinafter, referred to as "disturbance load torque Yz") is sent to the processor 11 which reads and processes the disturbance load torque Yz as required. Processings effected by the observer 410 and the processor 11 will be described later in detail.

A spindle control circuit 71 receives commands such as a spindle rotation command, spindle orientation command and the like and outputs a spindle speed signal to a spindle amplifier 72. On receiving the spindle speed signal, the spindle amplifier 72 rotates the spindle motor 73 at a commanded RPM. Further, the spindle amplifier 72 positions the spindle at a predetermined position in response to the orientation command.

A position coder 82 is coupled with the spindle motor 73 through a gear or belt. Therefore, the position coder 82 is rotated in synchronism with the spindle motor 73, and outputs feedback pulses which are read by the processor 11 through an interface 81. The feedback pulses are used to carry out machining such as drilling of holes and the like by moving the other axes in synchronism with the spindle motor 73. Further, a speed signal X1s can be created by subjecting the feedback pulse to the F/V (frequency/velocity) conversion.

The spindle control circuit 71 includes an observer 710 similarly to the axis control circuit 43. The observer 710 estimates a disturbance load torque Ys acting on the spindlemotor 73 upon receipt of the speed signal X1s and the like. The estimated disturbance load torque Ys (hereinafter, referred to as "disturbance load torque Ys") is sent to the processor 11 which reads and processes the disturbance load torque Ys as necessary. Processings effected by the observer 710 and the processor 11 will be described later in detail.

A drill 75 is mounted on the spindle head 74 of the spindle motor 73. The rotation of the drill 75 is controlled by the spindle motor 73. Further, a position and a feed speed of the drill 75 in the Z-axis direction are controlled by the servomotor 63 through the spindle head 74.

The drill 75 is fed in the Z-axis direction by the servomotor 63 and drills a hole to a workpiece 91. The workpiece 91 is fixed on a table 92 and the movement of the table 92 is controlled in X- and Y-axes direction by the X-axis servomotor 61 and the Y-axis servomotor 62, respectively, although the mechanism of the movement is not shown here.

Next, the observer 410 for estimating the disturbance load torque Yz and the observer 710 for estimating the disturbance load torque Ys will be described.

Figure 3:
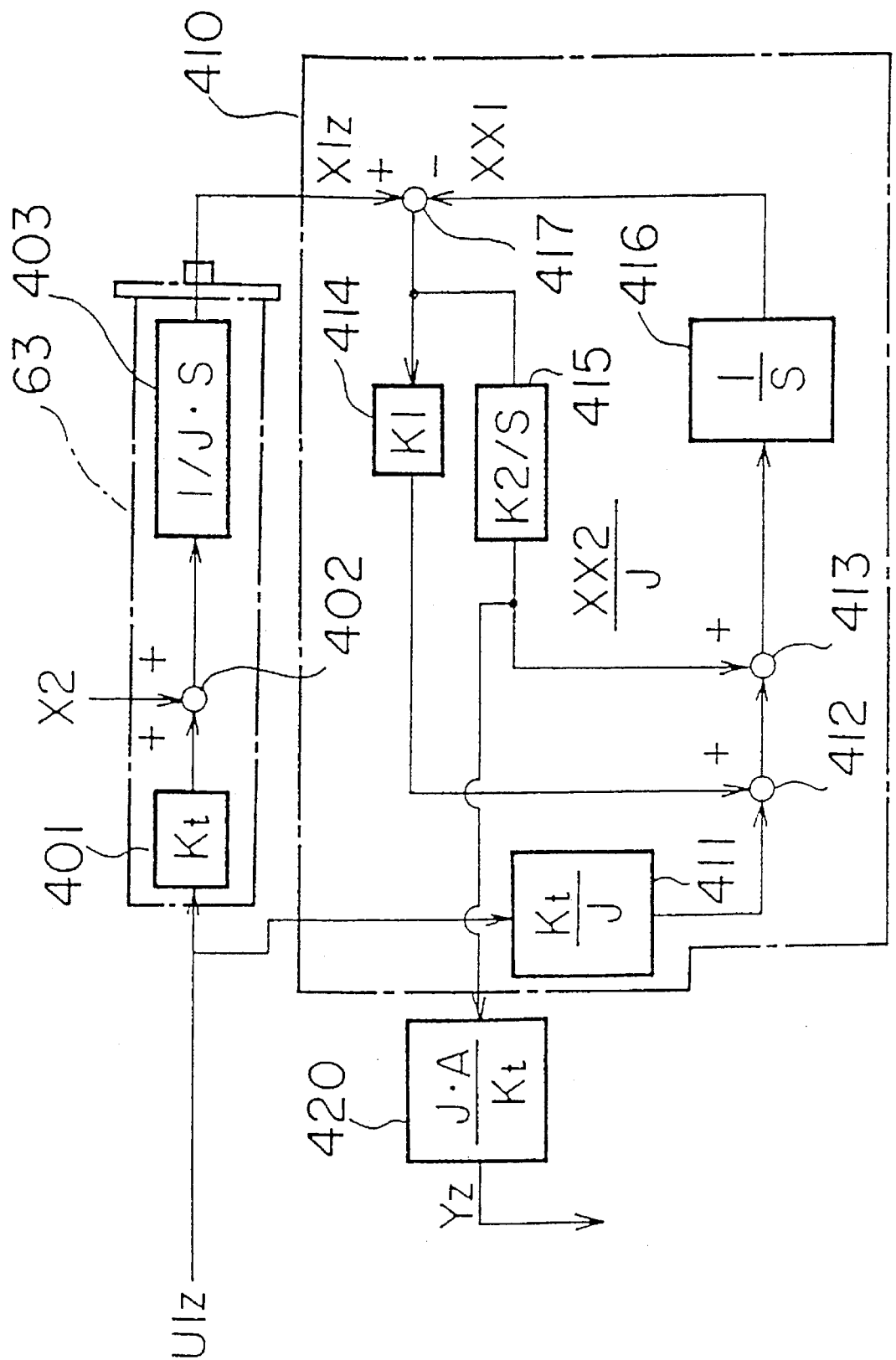
FIG. 3 is a block diagram of an observer.

FIG. 3 is a block diagram of the observer for estimating the disturbance load torque. As described above, the processing shown in the block diagram is executed by the observer 410 of the axis control circuit 43 and the observer 710 of the spindle control circuit 71. Since the observers 410 and 710 have the same arrangement, only the observer 410 will be described here and the description of the observer 710 is omitted.

The disturbance load torque Yz estimated by the observer 410 is obtained by subtracting an acceleration/deceleration torque for acceleration and deceleration from a total torque of the servomotor 63 and equivalent to a thrust reaction force (cutting reaction force) in an axis direction generated between the drill 75 and the workpiece 91 in drilling operation of the embodiment.

Further, the disturbance load torque Ys estimated by the observer 710 is obtained by subtracting an acceleration/deceleration torque for acceleration and deceleration from a total torque of the spindlemotor 73 and includes a disturbance load torque such as a cutting load torque, a friction torque of a mechanical portion and the like. When machining conditions, a material of a workpiece and the like are given, however, torques other than a cutting load torque can be excluded by a predetermined calculation method. Thus, in this embodiment it is supposed that the disturbance load torque Ys is equivalent with the cutting load torque.

In FIG. 3, a commanded current value U1z is a commanded torque value which is output to the servomotor 63 by receiving a movement command from the processor 11 and is input to an element 401 to drive the servomotor 63.

A disturbance load torque X2 is added to a torque output from the servomotor 63 in an arithmetic element 402. An output from the arithmetic element 402 is made to the speed signal X1z in an element 403. J denotes here an inertia of the servomotor 63.

On the other hand, the commanded current value U1z is input to the observer 410. The observer 410 estimates the disturbance load torque from the commanded current value U1z and the speed signal X1z of the servomotor 63. Note, a speed control of the servomotor 63 is not described here and only arithmetic operation for estimating the disturbance load torque will be described. The commanded current value U1z is multiplied by (Kt/J) in an element 411 and output to an arithmetic element 412. The output to the element 412 is added with a feedback signal from a proportion element 414 to be described later in the arithmetic element 412 and further added with a feedback signal from an integration element 415 in an arithmetic element 413. An unit of outputs from the arithmetic elements 412 and 413 is an acceleration. An output from the arithmetic element 413 is input to an integration element 416 and output as an estimated speed XX1 of the servomotor 63.

A difference between the estimated speed XX1 and the actual speed X1z is determined by an arithmetic element 417 and is fed back to the proportion elements 414 and integration element 415, respectively. The proportion element 414 has a proportional constant K1. The proportional constant K1 has a unit of $sec^{-1}$. Further, the integration element 415 also has an integration constant K2. The integration constant has a unit of $sec^{-2}$.

An output (XX2/J) from the integration element 415 can be determined from the following formula.

$$(XX2/J) = (X1z - XX1) \cdot (K2/S)$$
$$= (X2/J) \cdot [K2/(S^2 + K1 \cdot S + K2)]$$

Therefore, when the constants K1, K2 are selected so that a pole is stabilized, the above formula is represented as follows:

$$(XX2/J) \approx (X2/J)$$

$$XX2 \approx x2$$

That is, the disturbance load torque X2 can be estimated by XX2. Note, although an output from the integration element 415 is an estimated acceleration (XX2/J) which is obtained by dividing the estimated disturbance load torque XX2 by J and converted into a current value by an proportion element 420, the current value is represented by the estimated disturbance load torque Yz so that it is represented by torque. J denotes an inertia of the servomotor 63 in the same way as the torque constant of the element 401. A is a coefficient of 1 or less and used to correct the estimated acceleration (XX2/J). The disturbance load torque Yz (X2) of the servomotor 63 can be estimated using the observer 410.

The disturbance load torque Ys of the spindle motor 73 can also be estimated using the observer 710 in the same way. In this case, the observer 710 estimates the disturbance load torque Ys from a commanded current value U1s and the speed signal X1s of the spindle motor 73. The current command value U1s is a commanded torque value output to the spindle motor 73 by receiving a spindle rotation command from the processor 11.

Although these estimated disturbance load torques Yz and Ys are of course estimated values, the following description will be made by calling the estimated disturbance torques Yz, Ys as the disturbance load torques Yz, Ys.

As described above, the processor 11 monitors the disturbance load torque Yz, i.e., a thrust reaction force (cutting reaction force) generated between the drill 75 and the workpiece 91 and controls the thrust reaction force Yz so that it is changed following a predetermined control pattern (command pattern).

Figure 4:
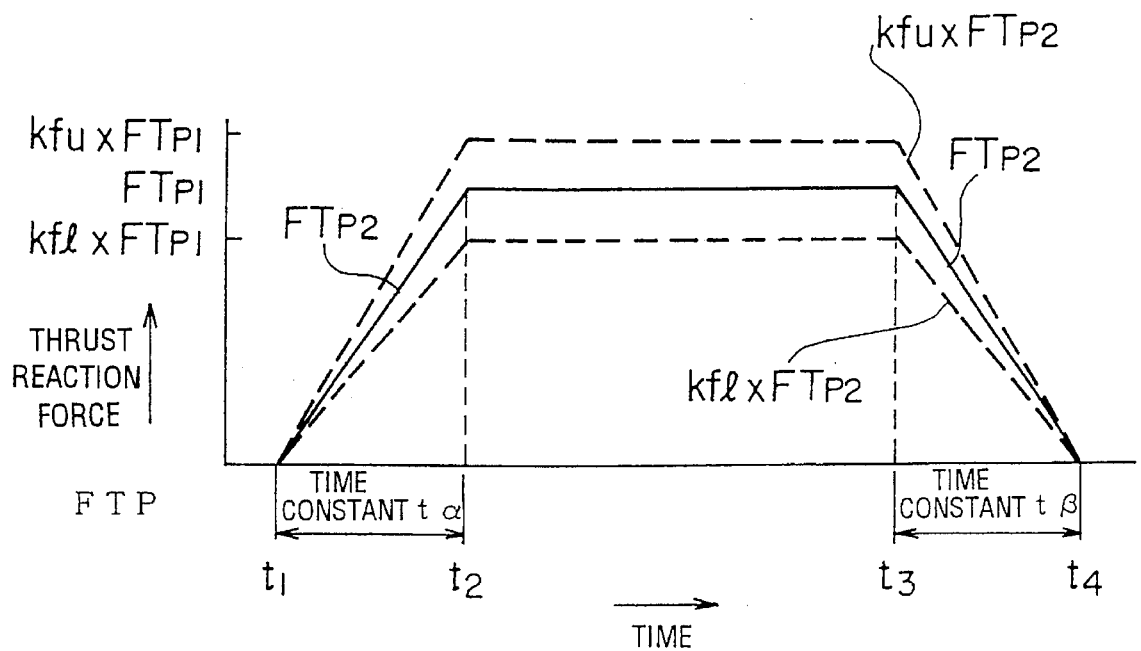
FIG. 4 is a graph showing an example of a thrust reaction force control pattern.

FIG. 4 is a graph showing an example of the thrust reaction force control pattern. As shown in the graph, thrust reaction forces FTp from a time $t_1$ to a time $t_2$ and from a time $t_3$ to a time $t_4$ are denoted by $FTp_2$ and the thrust reaction force FTp from the time $t_2$ to the time $t_3$ which is kept to a constant value is denoted by $FTp_1$. The thrust reaction force $FTp_2$ from the time $t_1$ to the time $t_2$ has a time constant $t\alpha$ and the thrust reaction force $FTp_2$ from the time $t_3$ to the time $t_4$ has a time constant $t\beta$. Further, upper and lower limits of change ratios predetermined as a control pattern for changing the thrust reaction forces $FTp_1$ and $FTp_2$ are supposed to be kfu and kfl, respectively. Various control patterns are determined and stored in the CMOS 14 as shown in FIG. 4. The processor 11 controls the thrust reaction force based on the control patterns.

Figure 5:
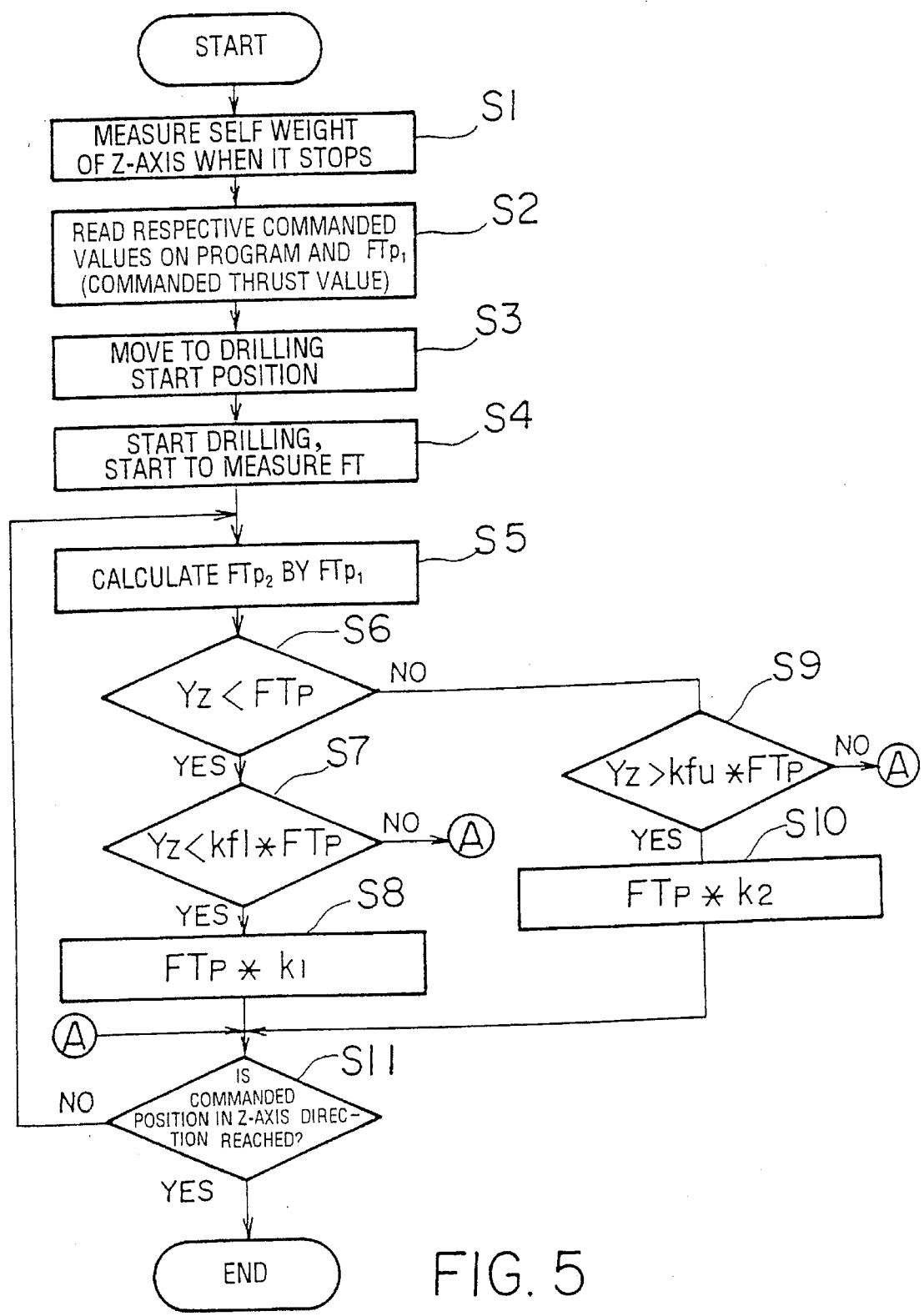
FIG. 5 is a flowchart showing a processing sequence of the present invention.

FIG. 5 is a flowchart showing a processing sequence of the present invention. In FIG. 5, each numeral following the letter "S" represents a step number. The processor 11 controls a thrust reaction force according to the processing sequence.

[S1] A self-weight of the Z-axis at rest is measured so that a thrust reaction force can be correctly estimated by the observer 410.

[S2] Respective commanded values are read on a machining program and a commanded value of the thrust reaction force FTp is read from a control pattern stored in the CMOS 14.

[S3] A drill is moved to a drilling start position.

[S4] Drilling operation is started and the observer 410 starts to estimate the disturbance load torque Yz (hereinafter, referred to as "thrust reaction force Yz").

[S5] The thrust reaction force $FTp_2$ in acceleration/deceleration is calculated from a value of the thrust reaction force $FTp_1$ commanded on the machining program and the time constants $t\alpha$, $t\beta$.

[S6] It is determined whether or not the thrust reaction force Yz estimated by the observer 410 is smaller than the thrust reaction force FTp ($FTp_1$, $FTp_2$) commanded by reading the control pattern. If the former is smaller than the latter, the process goes to step S7, and if not, the process goes to step S9, respectively.

[S7] It is determined whether or not the estimated thrust reaction force Yz is smaller than a value obtained by multiplying the thrust reaction force FTp by the value of the lower limit change ratio kfl (kfl×FTp). If the former is smaller than the latter, the process goes to step S8, and if not, the process skips to step S11.

[S8] The thrust reaction force FTp as a commanded value is increased by multiplying the thrust reaction force FTp by a thrust increasing ratio $k_2$ so that a predetermined control can be followed better.

[S9] It is determined whether the estimated thrust reaction force Yz is larger than a value obtained by multiplying the thrust reaction force FTp by the value of the upper limit change ratio kfu (kfu×FTp). If the former is larger than the latter, the process goes to step S10, and if not, the process skips to step S11.

[S10] The thrust reaction force FTp as a commanded value is decreased by multiplying the thrust reaction force FTp by a thrust decreasing ratio $k_2$ so that the predetermined control can be followed better. These steps S7–S10 enable the thrust reaction force FTp to remain between kfu×FTp$_2$ and kfl×FTp$_2$ and between kfu×FTp$_1$ and kfl×FTp$_1$ in FIG. 4 so that the thrust reaction force FTp is changed following the commanded control pattern.

[S11] Drilling operation is carried out by controlling a torque value commanded to the servomotor 63 as a feed axis so that the estimated thrust reaction force Yz follows the thrust reaction force FTp as a commanded value. As a result, it is determined whether or not a position of a drill tip has reached a commanded position in the Z-axis direction. If it has reached there, the program is ended, and if not, the process returns to step S5.

Figure 1:
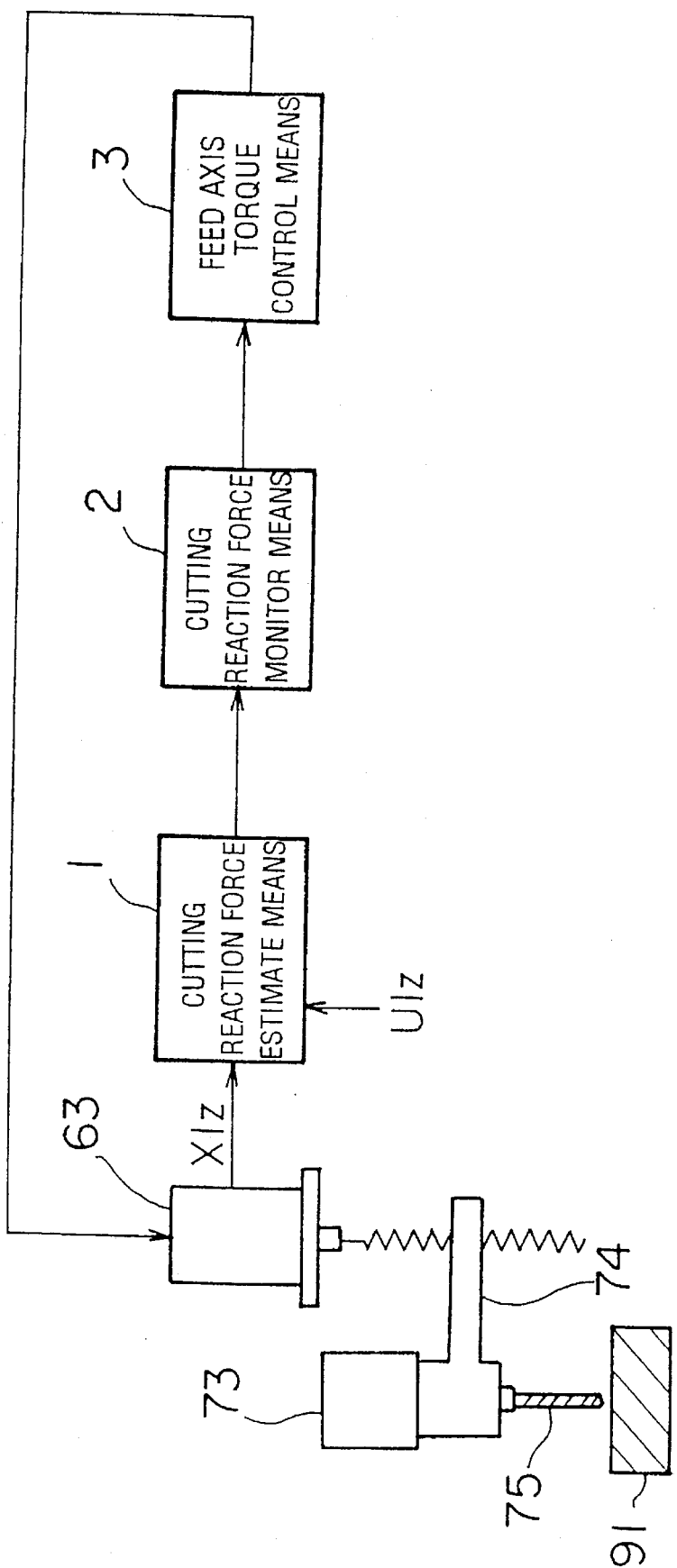
FIG. 1 is a block diagram of a principle of the present invention.

FIG. 1 is a block diagram showing a principle of the present invention. Cutting reaction force estimate unit 1 estimates the disturbance torque Yz acting on the servomotor 63 based on the speed signal X1z of the servomotor (feed axis) 63 and the torque value U1z commanded to the servomotor 63. In drilling operation, the cutting reaction force Yz is equivalent to the cutting reaction force generated between the drill 75 and the workpiece 91. Cutting reaction force monitor unit 2 monitors whether the disturbance torque Yz estimated by the cutting reaction force estimate unit 1 follows a predetermined pattern. If the disturbance torque Yz does not follow the predetermined pattern, feed axis torque control unit 3 controls a torque of the servomotor (feed axis) 63 so that the disturbance torque Yz is caused to follow the predetermined torque. The cutting reaction force generated between the drill 75 and the workpiece 91 is changed according to the predetermined pattern by controlling the torque of the feed axis.

Next, how a broken drill is sensed by monitoring the thrust reaction force Yz will be described.

Figure 6:
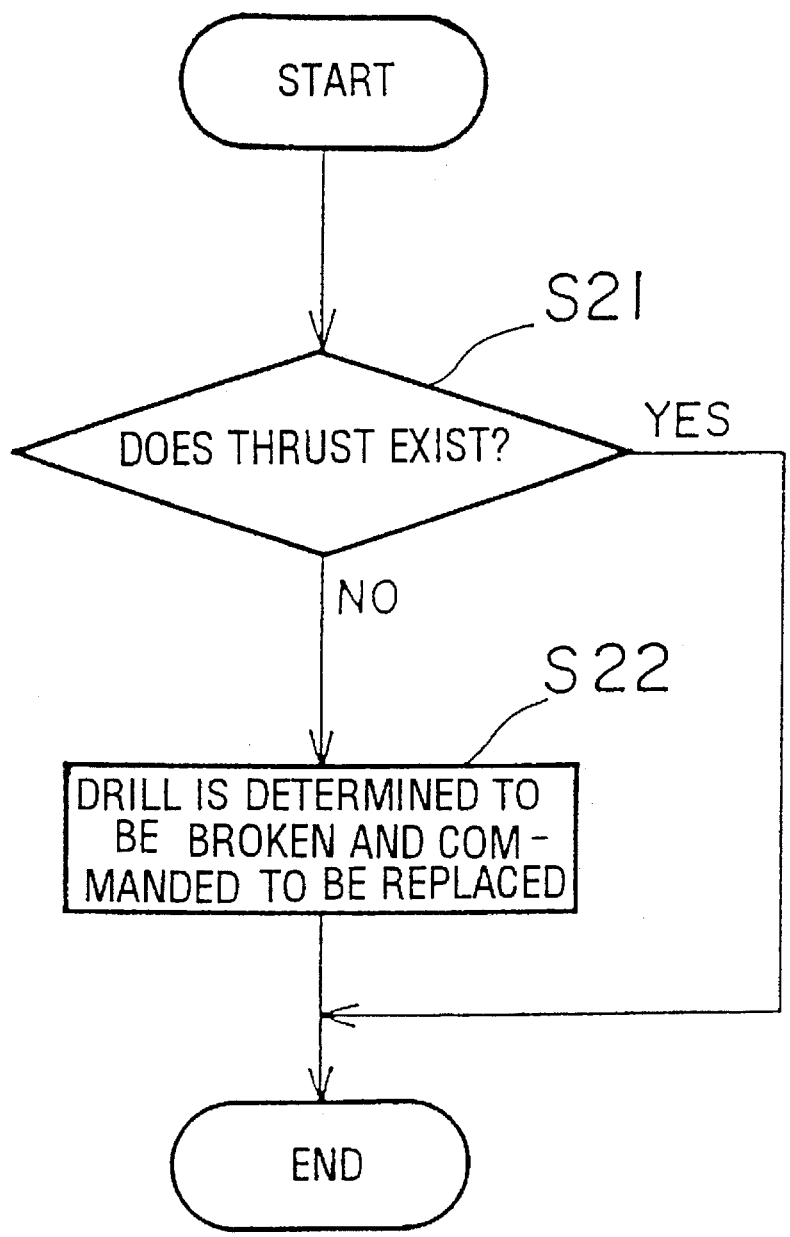
FIG. 6 is a flowchart showing a processing sequence for sensing a broken drill.

FIG. 6 is a flowchart showing a processing sequence for sensing a broken drill. In FIG. 6, each numeral following the letter "S" represents a step number.

[S21] It is determined whether the thrust reaction force Yz is sensed during drilling operation. If the thrust reaction force Yz is sensed, the program is ended as it is, and if not, the process goes to step S22.

[S22] Since the thrust reaction force Yz is not sensed, it is determined that a drill is broken and the stop of feed or replacement of the drill is commanded.

Although it is determined whether the thrust reaction force Yz is sensed in the above description, it may be determined whether the thrust reaction force Yz is smaller than a predetermined value.

Next, life management of a drill which can be made possible by controlling the thrust reaction force Yz will be described. The life management is executed by making use of a fact that when a machining efficiency is lowered by the wear and the like of a drill tip, it appears as an increase of a machining time under the conditions that a load imposed on a drill is kept constant by the control of the thrust reaction force Yz.

Figure 7:
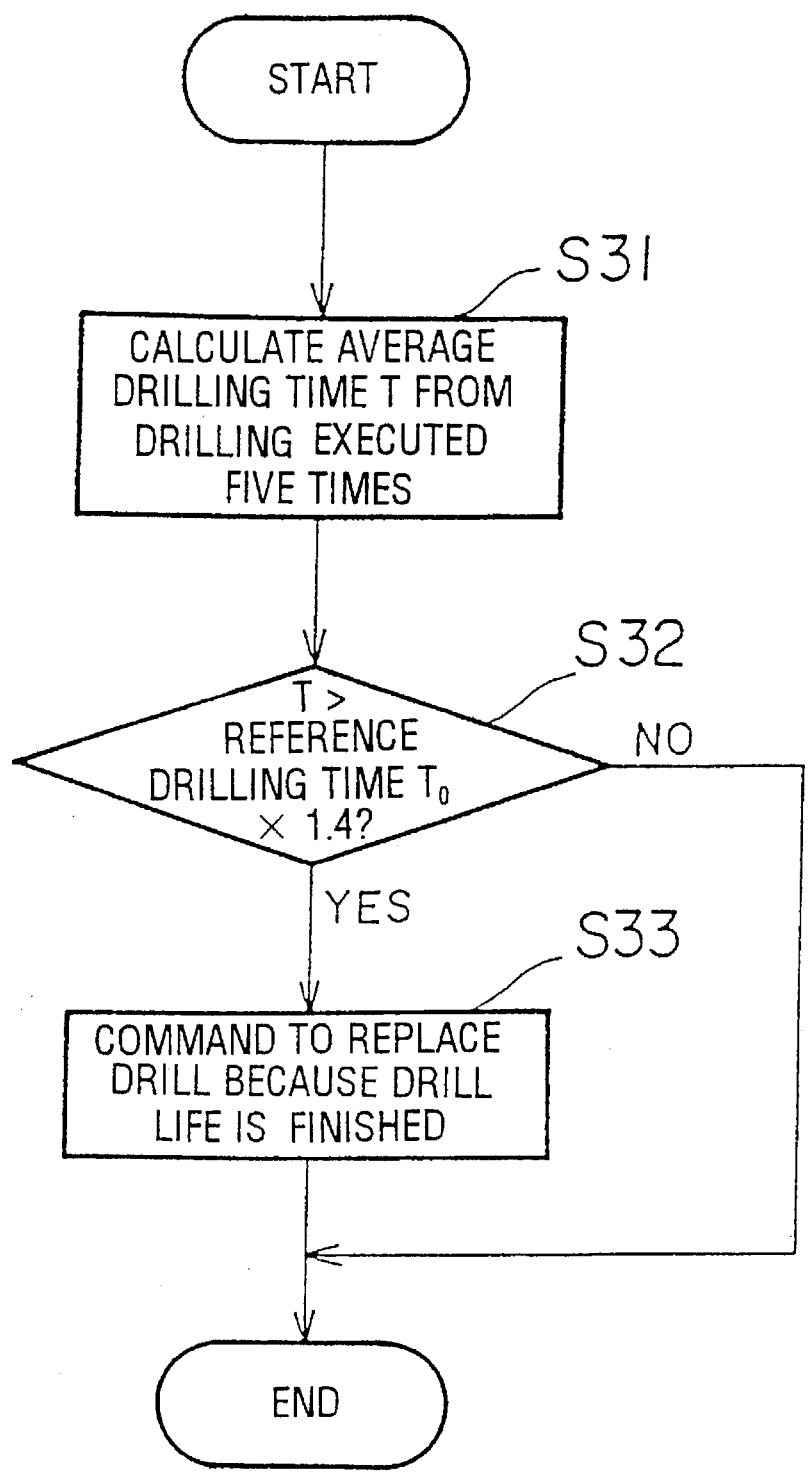
FIG. 7 is a flowchart showing a processing sequence for managing a drill life.

FIG. 7 is a flowchart showing a processing sequence for managing a drill life.

[S31] An average drilling time T is calculated by drilling a hole five times.

[S32] It is determined whether the average machining time T is 40% greater than a reference drilling time $T_0$, that is, whether the machining time T is greater than a value represented by reference drilling time×1.4. If the former is greater than the latter, the process goes to step S33, and if not, the program is ended as it is. Note, the reference drilling time $T_0$ is obtained by measuring a drilling time many times (e.g., 30–100 times) when a new drill is used and averaging the drilling times.

[S33] Step 33 is a case that a long time was needed for drilling operation and in this case the stop of feed or replacement of the drill is commanded because the drill life is determined to be finished.

Note, although the average drilling time T is compared with the reference machining time in the above description, a drilling speed may be compared with a reference drilling speed.

As described above, according to this embodiment, a torque value commanded to the feed axis (servomotor 63 of the Z-axis) is controlled so that the estimated thrust reaction force Yz is changed following a predetermined control pattern. As a result, drilling operation can be carried out in such a manner that the CNC adjusts a feed force according to a thrust reaction force similarly to, for example, handle operation effected by the skilled operator in a bench drilling machine. Therefore, the drilling operation can be carried out without an excessive load imposed on a drill.

A broken drill can be properly sensed by monitoring the thrust reaction force Yz.

Further, a drill life can be properly sensed by making use of a fact that when a machining efficiency is lowered by the wear and the like of a drill tip, it appears as an increase of a machining time under the conditions that a load imposed on a drill is kept constant by controlling the thrust reaction force Yz.

Next, a second embodiment of the present invention will be described.

Figure 8:
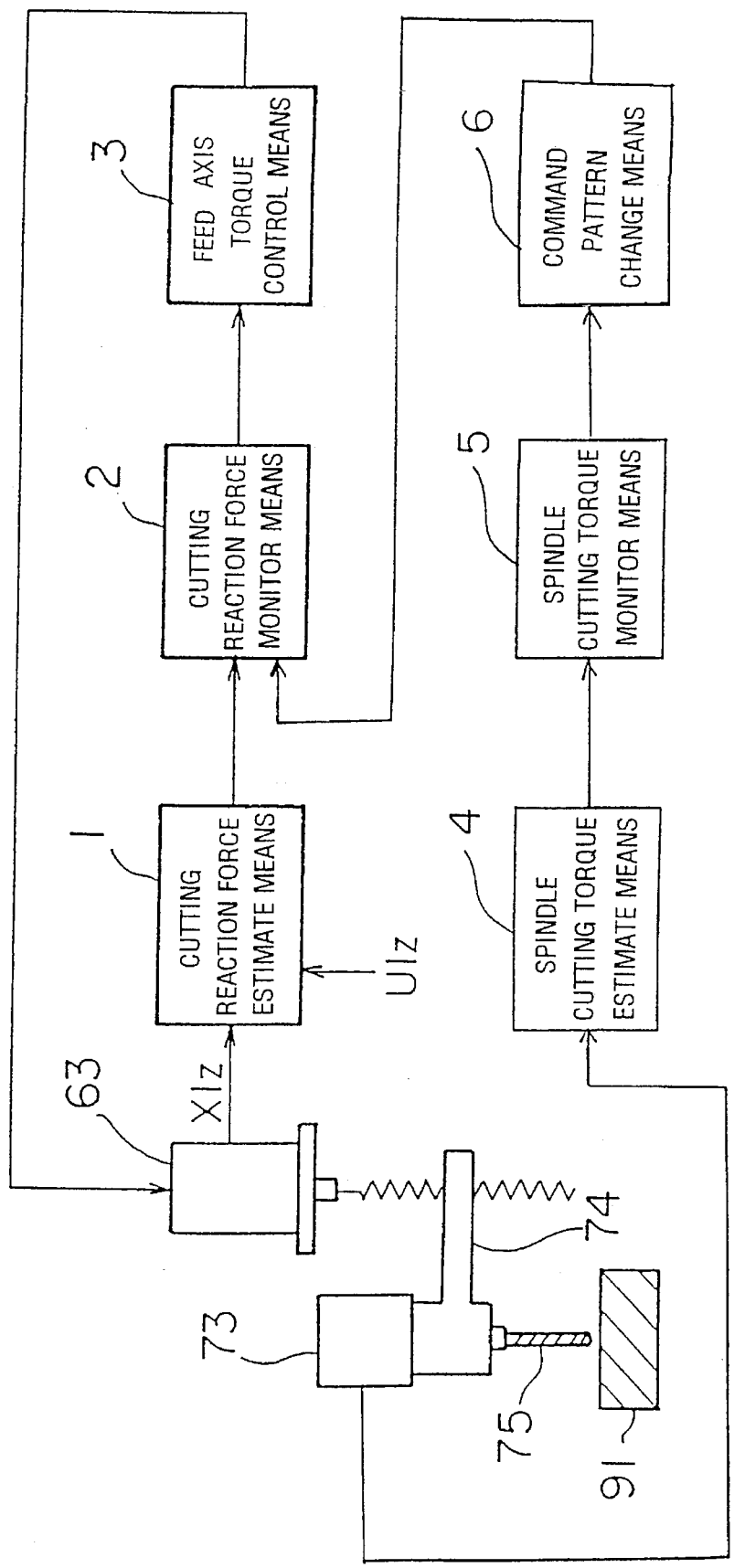
FIG. 8 is a block diagram showing a principle of a second embodiment of the present invention.

FIG. 8 is a block diagram showing a principle of the second embodiment of the present invention. The second embodiment is further provided with spindle cutting torque estimate unit 4, spindle cutting torque monitor unit 5 and command pattern change unit 6 in addition to the arrangement in the block diagram showing the principle in FIG. 1.

The spindle cutting torque estimate unit 4 estimates a cutting load torque of the spindlemotor 73 for driving the drill 75 in rotation through the observer 710. The spindle cutting torque monitor unit 5 monitors whether the cutting load torque Ys estimated by the spindle cutting torque estimate unit 4 is greater than a predetermined torque. When spindle cutting torque monitor unit 5 determines that the estimated cutting load torque Ys is greater than the predetermined torque, the command pattern change unit 6 changes a preset control pattern of the thrust reaction force Yz. The control pattern is changed in such a manner that a commanded value of a thrust reaction force FTP in the control pattern is equally decreased by a given ratio α.

Figure 9A:
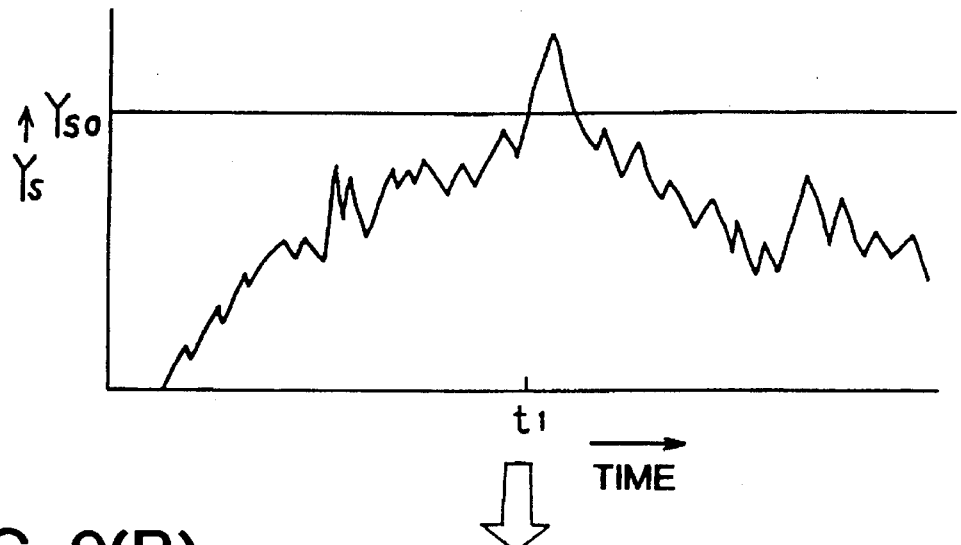
FIGS. 9(A) and (B) are graphs explaining a change of a control pattern.
Figure 9B:
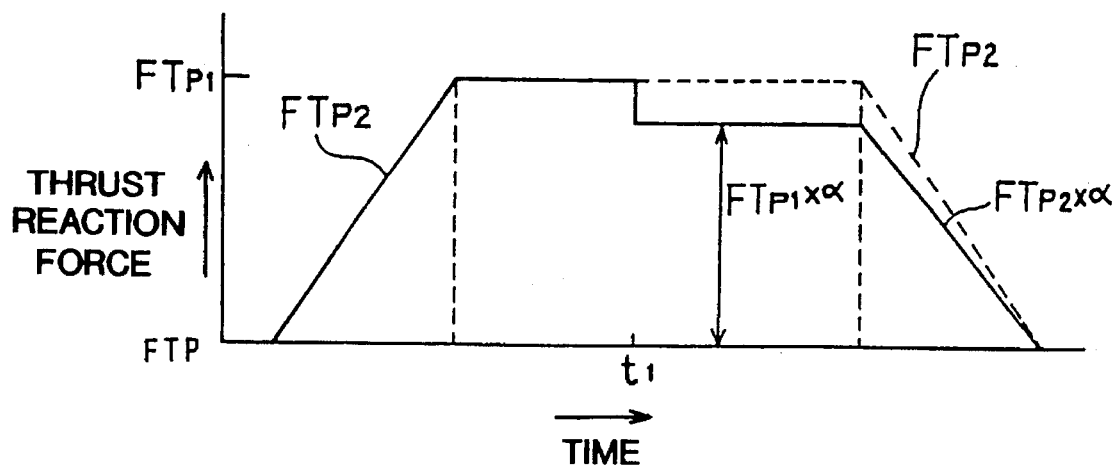

FIGS. 9(A) and (B) are graphs explaining a change of a control pattern. When the cutting load torque Ys estimated by the observer 710 exceeds a predetermined torque Ys$_0$ at a time $t_1$ as shown in FIG. 9(A), the control pattern is decreased at a predetermined ratio by multiplying a value of the thrust reaction force FTP commanded thereafter by a coefficient α(<1) as shown in FIG. 9(B).

As described above, since the direct cutting load torque on the spindle side is estimated as Ys and when the torque Ys is greater than a predetermined torque, a commanded value of the thrust reaction force FTP is reduced, drilling operation can be properly effected in accordance with a load applied to the drill 75 at that time without imposing an unreasonable load on the drill 75.

Although the thrust reaction force Yz is control led, an estimated cutting load torque of the spindle motor 73 is monitored and the control pattern is changed by the CNC, respectively, these operations may be performed by the PMC or an external control unit.

As described above, according to the present invention, a torque value commanded to the feed axis is controlled so that an estimated cutting reaction force follows a predetermined control pattern. As a result, drilling operation can be performed by adjusting a feed force by the CNC in accordance with a cutting reaction force like operation of a handle of a bench drilling machine effected by the skilled operator. Therefore, drilling operation can be performed without excessively imposing a load on a drill.

Further, since a cutting load torque of a drill is also estimated and when the estimated cutting load torque is greater than a predetermined torque, a control pattern of the cutting reaction force is changed, drilling operation can be properly effected in accordance with a load applied to the drill at that time without applying an unreasonable load to the drill.

We claim:

1. A drilling control apparatus for controlling drilling of holes to a workpiece using a numerically controlled machine tool, comprising:

cutting reaction force estimate unit for estimating a cutting reaction force along an axis direction generated between a drill and the workpiece;

cutting reaction force monitor unit for monitoring whether said cutting reaction force follows a predetermined command pattern; and feed axis torque control unit for controlling a torque of a feed axis of said drill to direct said estimated cutting reaction force to follow said command pattern if said cutting reaction force does not follow said command pattern.

2. A drilling control apparatus according to claim 1, wherein said cutting reaction force estimate means is disposed in an axis control circuit for outputting a speed command to said feed axis.

3. A drilling control apparatus according to claim 1, wherein when a feed speed of said feed axis is slower than a predetermined speed, then the drilling control apparatus commands stopping one of a feed effected by said feed axis and replacing said drill.

4. A drilling control apparatus according to claim 1, wherein when cutting reaction force is less than a predetermined amount, the drilling control apparatus determines that said drill is broken and commands stopping one of a feed effected by said feed axis and replacing said drill.

5. A drilling control apparatus for controlling drilling of holes to a workpiece using a numerically controlled machine tool, comprising:

cutting reaction force estimate unit for estimating a cutting reaction force along an axis direction generated between a drill and the workpiece;

cutting reaction force monitor unit for monitoring whether the cutting reaction force follows a predetermined command pattern;

feed axis torque control unit for controlling a torque of a feed axis of said drill to direct said estimated cutting reaction force to follow said command pattern when said estimated cutting reaction force does not follow said command pattern;

spindle cutting torque estimate unit for estimating a cutting load torque of a spindle of said drill;

spindle cutting torque monitor unit for monitoring whether said cutting load torque is greater than a predetermined torque amount; and command pattern change means for changing said command pattern when said estimated cutting load torque is greater than said predetermined torque amount.

6. A drilling control apparatus according to claim 5, wherein said command pattern change means uniformly reduces a commanded value of the cutting reaction force in said command pattern by a given ratio when said estimated cutting load torque is greater than said predetermined torque amount.

7. A drilling control apparatus according to claim 5, wherein said spindle cutting torque estimate unit is disposed in a spindle control circuit for issuing a speed command to said spindle.

* * * * *

UNITED STATES PATENT AND TRADEMARK OFFICE
CERTIFICATE OF CORRECTION

PATENT NO. : 5,599,142
DATED : February 4, 1997
INVENTOR(S) : Akihiko FUJIMOTO, et al.

It is certified that error appears in the above-indentified patent and that said Letters Patent is hereby corrected as shown below:

<u>Column 5</u>

Line 53, after "same way as the", insert --J of the previous element 403 and Kt is the same as the--.

Signed and Sealed this

Twenty-ninth Day of July, 1997

Attest:

BRUCE LEHMAN

Attesting Officer     Commissioner of Patents and Trademarks